United States Patent [19]

Salley et al.

[11] 4,251,014

[45] Feb. 17, 1981

[54] VARIABLY POSITIONABLE TRANSMISSION AND DRIVE ASSEMBLY FOR A PLANTER

[75] Inventors: Gordon L. Salley, Moline; Barton L. Swales, Coal Valley, both of Ill.

[73] Assignee: Deere & Company, Moline, Ill.

[21] Appl. No.: 922,619

[22] Filed: Jul. 7, 1978

[51] Int. Cl.³ ............................................. A01C 7/08
[52] U.S. Cl. .................................. 222/615; 111/69;
111/77; 222/623
[58] Field of Search ............... 222/609, 610, 613, 614,
222/615, 616, 623, 624; 74/340, 344, 395, 13;
111/69, 77, 78, 85; 239/661, 673, 677, 682, 685;
180/53 A, 53 AW

[56] References Cited

U.S. PATENT DOCUMENTS

| | | | |
|---|---|---|---|
| 2,758,555 | 8/1956 | Buhr | 111/69 |
| 3,738,181 | 6/1973 | Gandrud | 222/613 X |
| 3,749,035 | 7/1973 | Cayton et al. | 111/85 |
| 3,912,122 | 10/1975 | Knapp et al. | 111/77 X |
| 3,923,206 | 12/1975 | Gillies et al. | 111/77 X |
| 4,009,668 | 3/1977 | Brass et al. | 111/85 |
| 4,117,788 | 10/1978 | Whitehead | 111/78 X |

Primary Examiner—F. J. Bartuska

[57] ABSTRACT

A transmission and drive assembly for a planter that can be transversely positioned on and selectively clamped on the planter frame at desired locations out of interfering relationship with the planting units. The transmission is at the end of the frame outside of the outermost planter unit but may be easily repositioned on the frame as is necessary. A ground wheel assembly is secured to so as to optionally extend to the front or rear of the frame. It may also be adjusted transversely to accommodate adjustments in the row spacings. The dual assembly includes a countershaft journaled on both the transmission and the wheel assembly bracket and driven by the ground wheel through ratchet assemblies. The transmission is also securable to the frame to extend either to the front or the rear thereof. A crossover drive assembly is provided for transferring drive from the front to the rear of the frame when the transmission is mounted to extend to the front of the frame. The arrangement of components facilitates transverse positioning of the transmission and drive assembly so that row spacings can be adjusted as desired.

32 Claims, 6 Drawing Figures

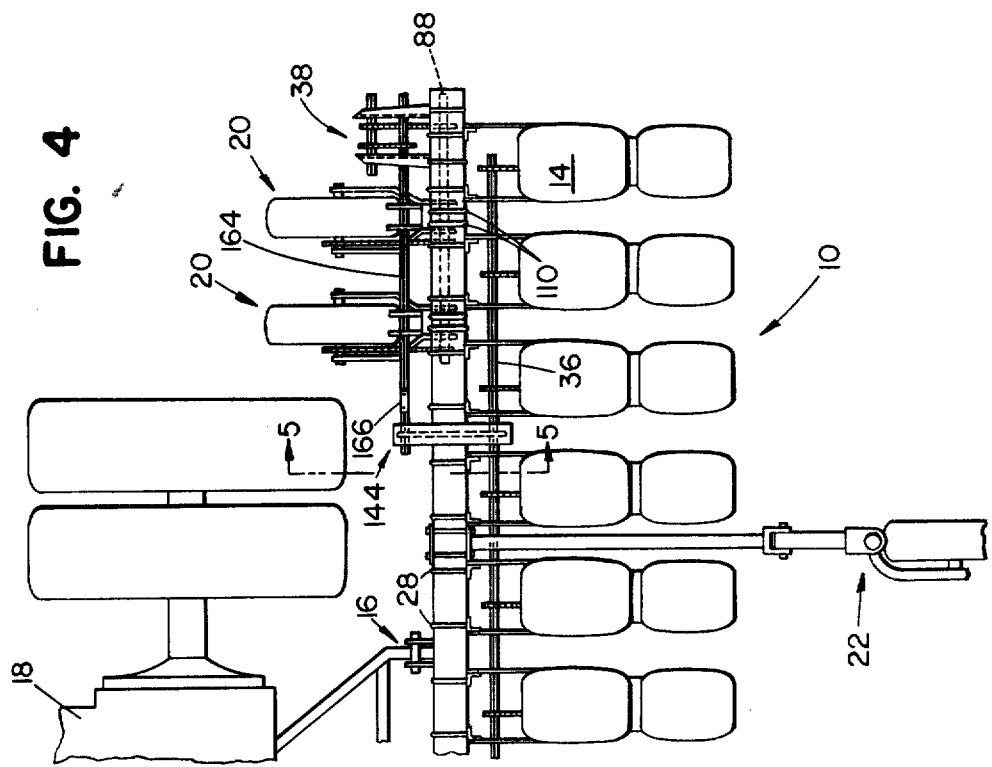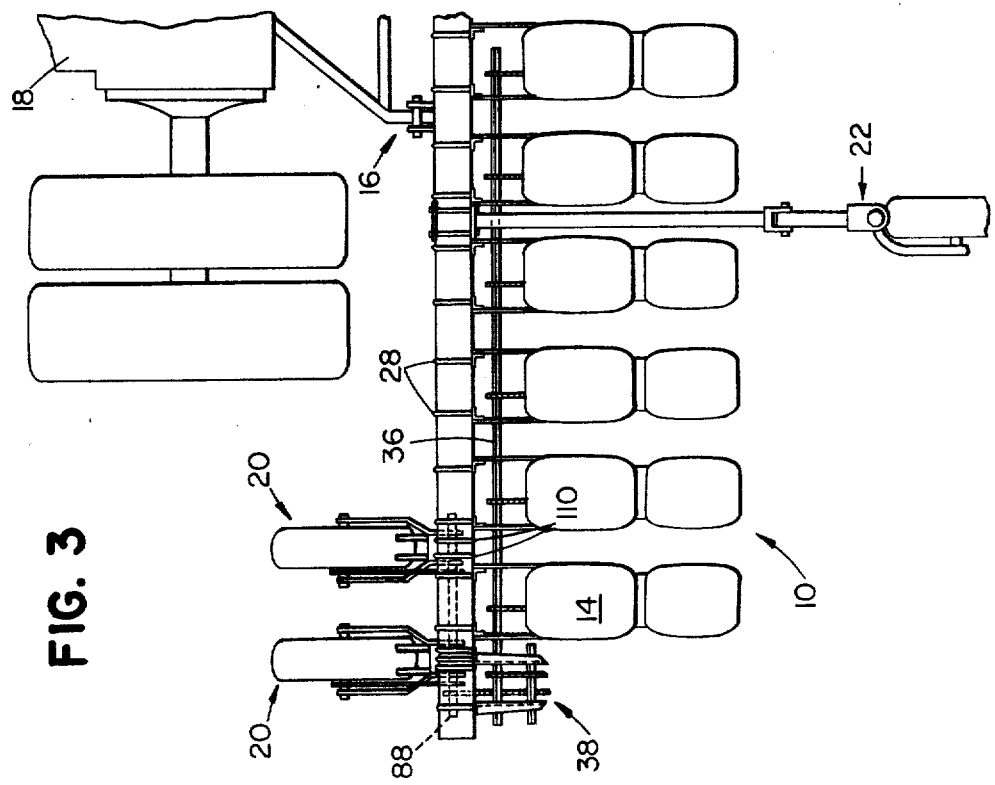

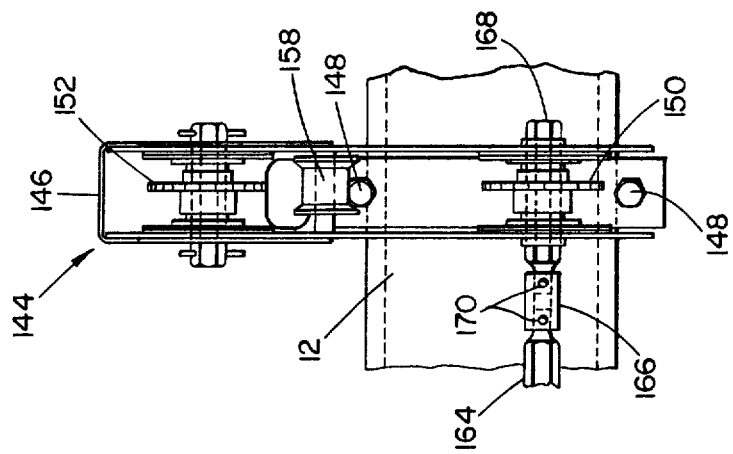
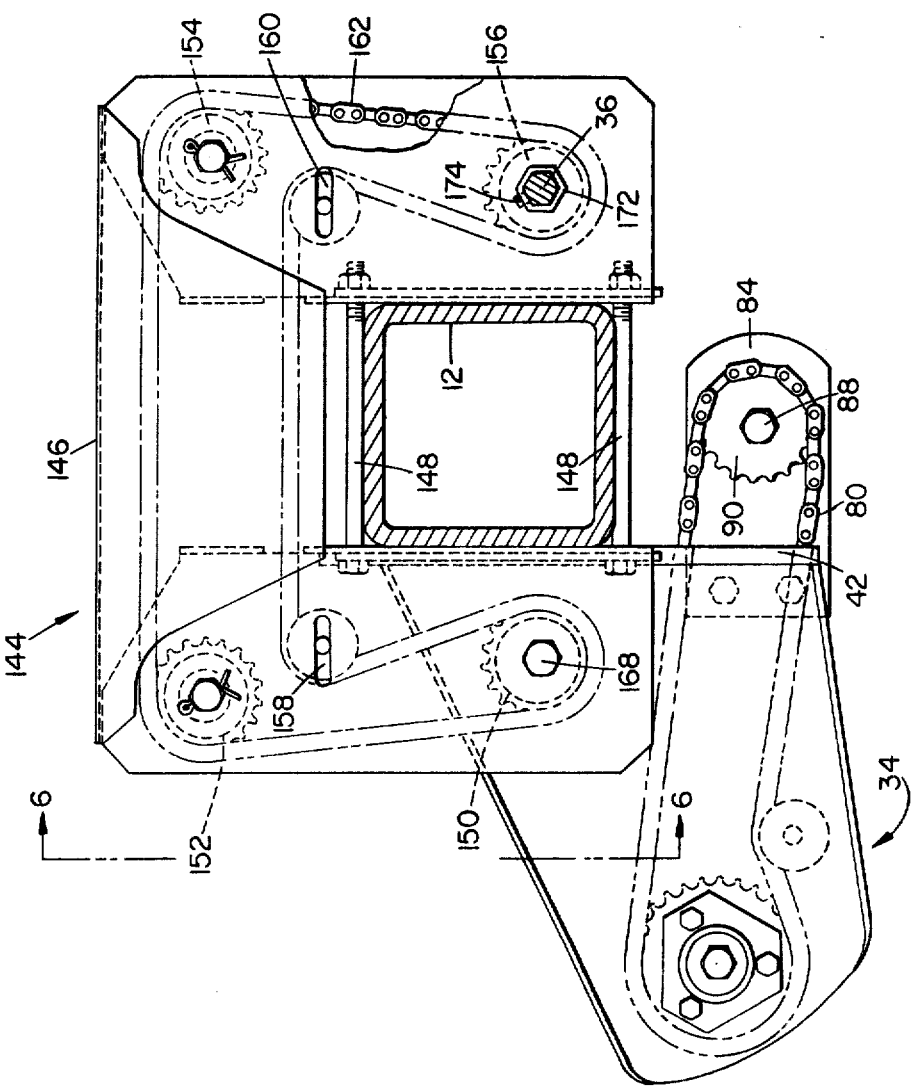

VARIABLY POSITIONABLE TRANSMISSION AND DRIVE ASSEMBLY FOR A PLANTER

FIELD OF THE INVENTION

This invention relates generally to a planter and, more particularly, relates to a selectively positionable transmission and drive assembly for a planter.

BACKGROUND OF THE INVENTION

Planters of the type having a main frame with a plurality of individual planting units mounted along the frame and adjustable to vary row width are well known. Many of the planter configurations include a sprocket and chain drive assembly, or transmission, permanently mounted between the individual planting units, generally in the middle and towards the rear of the main frame. A drive or ground wheel assembly mounted on the frame provides drive to the transmission which in turn rotates a drill shaft connected to the individual planting unit seed meters. By driving a plurality of planting units from a transmission, the need for a separate drive wheel for each individual unit is eliminated, and the seeding rate can be quickly and easily adjusted at the transmission. However, when relatively narrow row spacings are desired, the transmission has been found to interfere with the adjacent planting units. In many cases the desired narrow row spacing cannot be obtained because of the transmission. It has been necessary to use a different planter for narrow row crops than for wide row crops, or alternatively to use a wider spacing between the planting units on either side of the transmission than that used between the rest of the planting units. The latter method leaves a gap which is objectionable or unacceptable to the farmer. An alternate transmission and drive assembly is required to accommodate the narrow row spacing capabilities without the need for a separate drive wheel for each unit.

Another problem encountered with the permanently mounted center transmission is the lack of versatility in spacing the individual planting units on the frame. Often the location of the transmission interferes with the desired location for a particular planter unit, especially when an odd number of units are to be used and symmetrically located with respect to the center of the frame or when planting units are to be spaced between units already mounted on the frame.

SUMMARY OF THE INVENTION

It is, accordingly, an object of the present invention to provide a variably positionable transmission and drive assembly for a planter which can be positioned at any desired location along the frame out of interfering relationship with the individual planting units, even when narrow row spacings or an odd number of planting units are utilized.

It is a further object of the invention to provide a positionable transmission and drive assembly for a planter so that individual planting units can be quickly added or removed and the row spacing changed easily so that the need for two separate planters, one for narrow row crops and another for wider row crops, is eliminated.

It is still another object of the invention to provide a planter drive assembly and a transmission which clamp onto the frame of a planter and which are transversely adjustable thereon.

It is still another object of the present invention to provide a drive assembly and a transmission which can be either clamped towards the front or towards the rear of the main frame of the planter.

It is still another object of the invention to provide a variably positionable transmission and drive assembly which may be clamped at the desired location along the main frame, and which includes a transversely adjustable ground wheel assembly. The ground wheel assembly and the transmission carry bearing members for supporting a transverse countershaft centrally with respect to the fore-and-aft faces of the frame. A ground wheel drives a sprocket connected through a ratchet assembly to the countershaft. Another sprocket mounted on the countershaft drives the transmission. The sprockets and ratchet assembly are slidable with respect to the countershaft so that transverse adjustments of the transmission and/or the ground wheel assembly can be made easily to achieve the desired planter configuration.

It is yet another object of the present invention to provide a variably positionable transmission and drive assembly for a planter in which the ground wheels and the transmission can be attached either towards the front or the rear of the frame, with either the ground wheels or the transmission on the same or on opposite sides of the frame. Flexible positioning of the assemblies is provided without need of substantial modifications or part substitutions. A planter can be converted quickly between narrow and wide row spacings to eliminate the need for two planters.

It is yet another object of the invention to provide a selectively positionable transmission which can be secured towards the front or the rear of the main frame at any desired location to accommodate planter units spaced for narrow row planting, and which additionally allows for spacing of planting units the entire length of the main frame. A single transmission can be mounted on the frame, or if desired, when a large number of planter units are being driven, two transmissions can be used with one mounted near each end of the frame.

BRIEF DESCRIPTION OF THE DRAWINGS

The preferred embodiment of the invention will be described in conjunction with the accompanying drawings in which:

FIG. 3 is a schematical top view of the left half of the planter shown in FIG. 1;

FIG. 4 is a schematical top view of the right half of a modified form of a planter with planting units spaced the entire width of the frame and having a transmission mounted towards the front of the frame and including a crossover drive assembly;

FIG. 5 is a side view, partially broken away and with some parts removed for clarity, of the crossover drive assembly taken substantially along ine 5—5 of FIG. 4; and FIG. 6 is a front view of the crossover drive assembly with part of the housing and the chain removed.

DESCRIPTION OF THE PREFERRED EMBODIMENT

Figure 1:
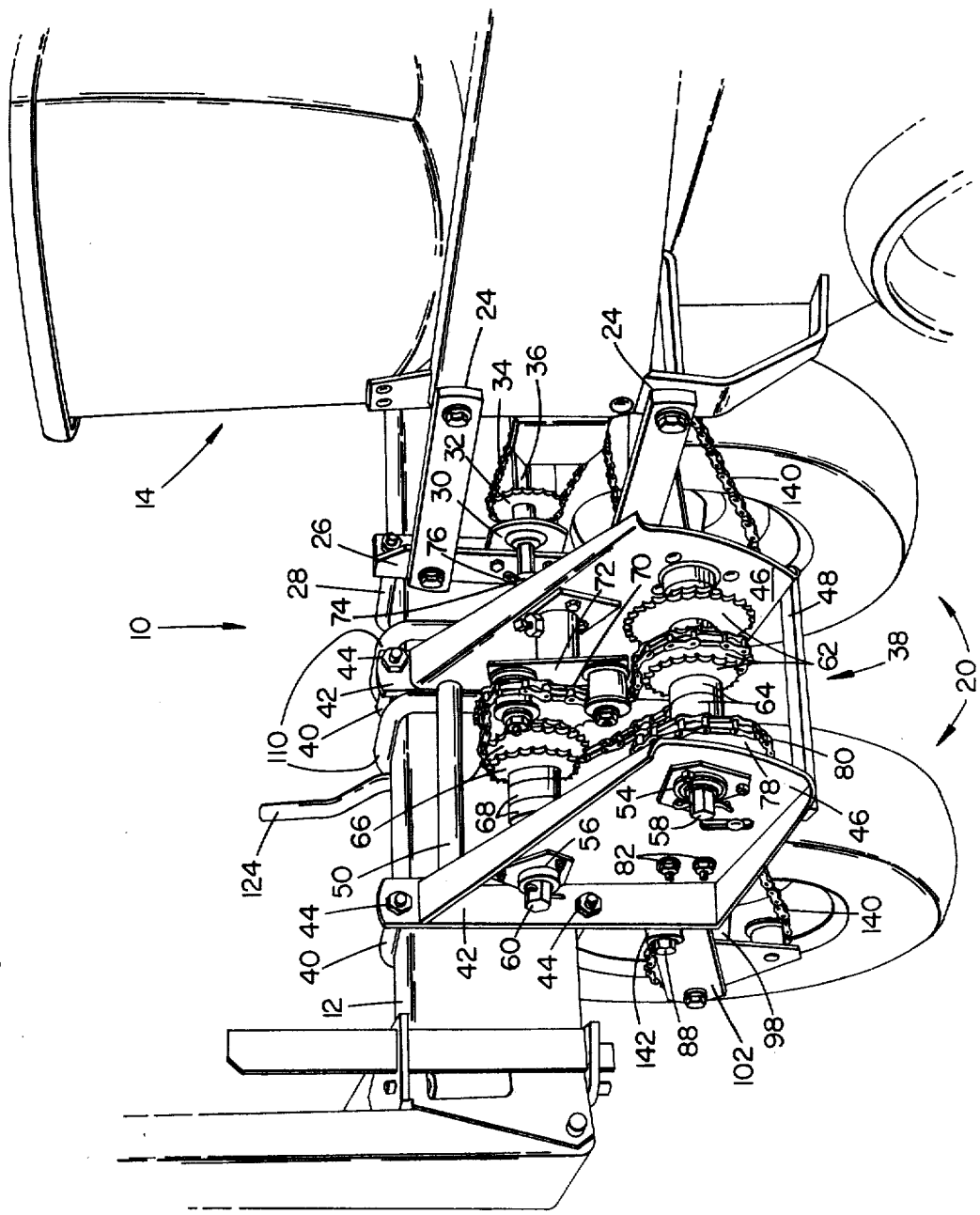
FIG. 1 is a perspective view of the left rear side of a planter, which includes the transmission and drive assembly of the present invention.
Figure 2:
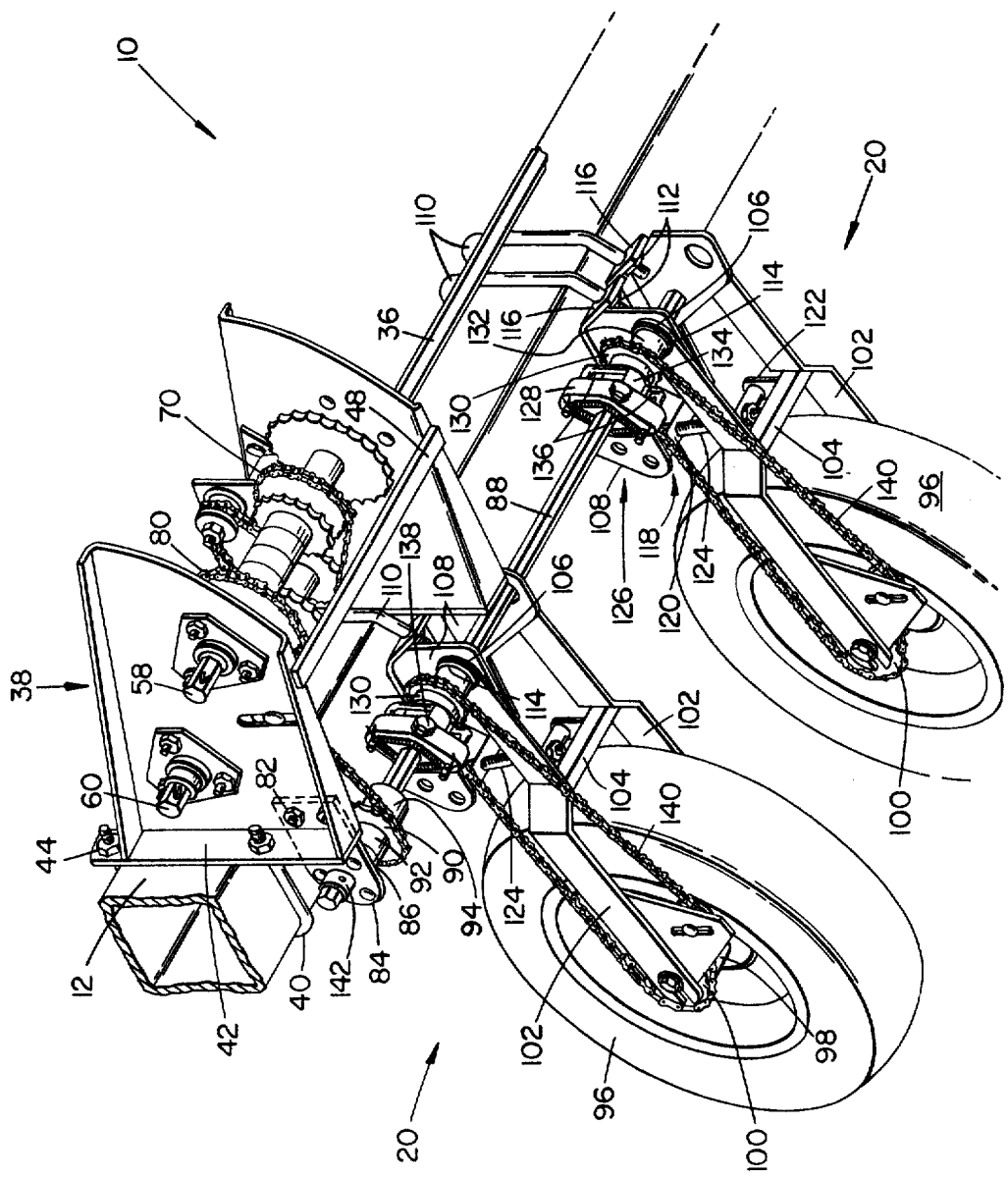
FIG. 2 is a bottom perspective view of the planter of FIG. 1 with some parts removed for clarity.

Referring to FIGS. 1-3 of the drawings, a planter is shown generally at 10 and includes a transversely elongated main frame 12 with a square cross section and substantially vertical fore-and-aft faces. A plurality of individual planting units 14 are mounted in trailing relation on the frame 12. A three-point or integral hitch 16 is provided on the frame for attachment to a tractor 18. In the embodiment shown in FIG. 3, a pair of ground wheel assemblies 20 are mounted on either side of the hitch 16 on the frame 12. Also mounted on the frame 12 on opposite sides of the hitch 16 are conventional lift assist wheel assemblies 22. Only the left half of the planter is shown in FIG. 3, but the right half is substantially the same.

The planting units 14 are of conventional design, such as those shown in U.S. Pat. No. 4,009,668, and include parallel link members 24 pivotally connected to planter brackets 26 secured to the frame 12 by transversely spaced U-bolts 28. A bearing support 30 connected to the bracket 26 journals a sprocket 32. A chain 34 trained between the sprocket 32 and a rear sprocket (not shown) provides drive to a seed metering mechanism on the planting unit 14. Each sprocket 32 has a hexagonal opening for receiving a transverse drill or main planter drive shaft 36 of mating hexagonal cross-section. The drill or main shaft 36 is transversely positionable with respect to the sprockets 32.

A bolt-on transmission assembly shown generally at 38 is secured near the end of the main frame 12 on the rearward face by U-bolts 40 which extend around the frame 12 and through a pair of vertical brackets 42. Nuts 44 are tightened against the brackets 42 to secure the transmission against the rear face of the frame 12. The transmission 38 includes side walls 46 secured in a spaced apart relationship by a lower brace 48 and an upper brace 50 which is generally parallel to but sufficiently spaced from the rear face of main frame 12 to accommodate one or more U-bolts between the brackets 42. Journaled between the side walls 46 in bearings 54 and 56 are hexagonal input and output shafts 58 and 60, respectively. The input shaft 58 slidably non-rotatably mounts a plurality of input sprockets 62 of varying sizes and also carries a plurality of spacers 64 for positioning the sprockets along the shaft. Similarly, the output shaft 60 carries a plurality of output sprockets 66 and spacers 68. A chain 70 is trained between one of the input sprockets 62 and one of the output sprockets 66, and an idler assembly 72 is provided for tightening the chain. The chain 70 can be selectively trained between various input-output sprocket combinations for adjusting the speed of the output shaft 60 in relation to the speed of the input shaft 58. Coupled to the output shaft 60 is a collar 74 which receives the end of the drill shaft 36 therein. The shaft 36 is non-rotatably secured in the collar 74 by a shear or cotter pin 76. A sprocket 78 is non-rotatably secured to the input shaft 58 and receives drive through a chain 80 trained around a sprocket of a ground wheel coupling assembly discussed in detail below.

Attached to one of the side walls 46 by bolts 82 is a countershaft bearing support member 84 which extends forwardly of the transmission 38 to a position centrally located with respect to the fore-and-aft faces of the frame 12 and beneath the frame. The member 84 carries a radial ball bearing 86 rotatably supporting a hexagonal countershaft 88. A drive sprocket 90 having a hub 92 with a hexagonal opening is slidably non-rotatably mounted on the countershaft 88. The sprocket 90 is aligned with the sprocket 78, and is secured in position between a set screw or collar member 94 and the bearing 86. The chain 80 is trained around the sprocket 90. The countershaft 88 is directly centered under and parallel to the main frame 12 for reasons which will become obvious later.

Also mounted on the frame 12 are the ground wheel assemblies 20 which provide the drive for the sprocket 90. Each assembly 20 includes a wheel 96 having a hub 98 which carries a sprocket 100. The hub is rotatably supported between a pair of identical wheel arms 102 which extend rearwardly and generally parallel to each other to a point behind the wheel 96 where they converge inwardly. The arms 102 again extend parallel to each other at a point just beyond a brace 104 which spaces the pair of arms. The arms 102 are pivotally connected to wheel arm bushings 106 mounted in a bracket 108 secured to the frame 12 by U-bolts 110 and nuts 112. Each of the brackets 108 is relatively narrow and in the embodiment shown in FIG. 2 remains forwardly of the plane of the rear face of frame 12 so that the bracket does not interfere with the positioning of the transmission 38 or the planting units 14. The U-bolts 40 are shown connected to the frame on either side of a transmission bracket 42 (FIG. 1). Each bracket 108 also carries a countershaft support bearing 114 centrally under the frame. The bearings 114, preferably radial ball bearings, are pressed into the wheel arm bushings 106, and along with the bearing 86 rotatably support the countershaft 88 without need for additional supports connected to the main frame 12. The pivotal axis of the arms 102 is located centrally under the frame and coincides with the axis of the countershaft 88. Each of the wheel assemblies 20 may be positioned along the main frame 12 at the desired location and then secured to the frame by tightening the nuts 112 on the U-bolts 110 against angled tabs 116 on the bracket 108. A conventional height adjustment mechanism 118 is provided including a trunnion 120 connected to the wheel brachet 108, an anchor 122 connected to the brace 104, and a threaded crank 124. As the crank 124 is turned, the screw threads move the anchor 122 and wheel arms 102 whith respect to the trunnion 120 to raise or lower the wheel 96.

The hexagonal countershaft 88, inserted through the hub 92 of the drive sprocket 90 and through the bearings 86 and 114, slidably carries a one-way clutch or ratchet assembly 126. The ratchet 126 has a main support member or ratchet dog carrier 128 with a hub having a hexagonal opening for slidably receiving the hexagonal countershaft 88. Rotatably mounted on the hub is a sprocket 130 secured in position on the hub by a retaining ring (not shown). A spacer 132 is used to position the assembly 126 with respect to the arm bushings 106. The sprocket 130 has a toothed hub 134 for engagement with ratchet dogs 136 so that the carrier, and thus the countershaft 88 rotate with the sprocket in the forward direction. A set screw 138 is provided to transversely secure the carrier 128 such that the sprocket 130 is in fore-and-aft alignment with the wheel sprocket 100. A chain 140 is trained between the sprockets 100 and 130. A collar 142 is secured to the contershaft 88 outwardly of the support member 84 to aid in restraining transverse movement of the countershaft which is slidably positionable within the bearings 86 and 114.

As the planter 10 is pulled by the tractor, the sprockets 100 rotate with the ground wheels 96 providing drive through the chain 140 and the sprockets 130 to the ratchet assembly 126 and the countershaft 88. The sprocket 90 rotates with the countershaft 88 driving the chain 80 and the sprocket 78 on the input shaft 52 of the transmission 34. The input sprockets 62 rotate with the input shaft 52. The chain 70 drives the output shaft 50 through an output sprocket 66. The drill shaft 36 rotates with the output shaft 60, driving the sprockets 32 on the planting units 14 and operating the seed metering mechanisms. The desired seeding rate is provided by training the chain 70 between the proper input-output sprocket combination.

In the embodiment shown, two bolt-on transmission assemblies 38 are used, one on either end of the frame 12. The drive assembly for the right half of the planter is generally identical to the assembly for the left half of the planter shown in FIG. 3. Two drill shafts 36 are used with one connected to each transmission output shaft 60 and driving half of the planter units. A separate countershaft 88 is used on each side of the planter. Because each transmission 38 is secured near the outer end of the frame 12, the individual planting units 14 can be mounted on the frame and uniformly spaced for narrow row planting without interference from a transmission. If an odd number of planting units 14 are to be mounted on the frame 12, the center planting unit can be connected directly at the center of the frame. When a small number of planting units 14 are to be mounted on the frame 12, a single countershaft 88 and a single drill shaft 36 can be used along with one transmission 38. Alternatively, if wider row spacings are to be used, the transmission 38 can be bolted to the center of the frame 12 between two adjacent planting units with a separate drill shaft 36 connected to each side of the output shaft 60. In this configuration, a single countershaft 88 can be used which extends between the ground wheel assembly or assemblies 20 on either side of the hitch 16.

The ground wheel assemblies 20 are transversely positionable on the frame 12 so they can be attached at the desired locations to accommodate a particular row spacing. To adjust an assembly 20 transversely, the nuts 112 on the U-bolts 110 are loosened, along with the set screw 138 of the ratchet assembly 126. The assembly 20 is moved transversely with the ratchet assembly 126 sliding along the shaft 88. When the assembly 20 is in the desired location and the sprocket 130 is aligned with the sprocket 100, the nuts 112 are tightened, and the set screw is secured against the countershaft 88. The transmission 38 can also be moved transversely by loosening the nuts 44 on the U-bolts 40, loosening the set screw member 94 which transversely secures the drive sprocket 90 against the bearing 86, and sliding the transmission with the countershaft support member 84 to the desired location. The drill shaft 36 is transversely positionable within the sprockets 32 on each of the planting units 14 so that it may be positioned to mate with the collar 74 on the transmission. The nuts 44 on the U-bolts 40 and the set screw member 94 are tightened after the transmission and the sprocket 90 are properly positioned. By using the hexagonal countershaft and drill shaft, each of which is slidably positionable with respect to the sprockets and/or ratchet members mounted for rotation therewith, transverse adjustment of the transmission or the wheel assemblies is accomplished easily and quickly to accommodate changes in the row spacing or in the number of planting units used. The wheel bracket 108 for each of the wheel assemblies 20 is relatively narrow, and the U-bolts 100 can be positioned so they straddle a single one of the U-bolts 40, as shown in FIGS. 1 and 2. Also the U-bolts 110 can be positioned between the U-bolts 28 for two adjacent planting units 14 even when narrow row spacings are used, or positioned so they straddle a one of the U-bolts 28. The flexibility in the positioning of the narrow bracket 108 increases the number of possible locations for the ground wheel assemblies 82 along the main frame 12 and accommodates narrow row spacings. Additionally, since the countershaft support bearings 114 mounted on the wheel brackets 108 are centrally located beneath the frame 12, the wheel assemblies can be reversed when certain planting unit configurations are used so that each wheel 96 trails rather than leads the frame 12 without affecting the fore-and-aft position of the countershaft. Therefore, it is possible with a number of planter configurations to reverse the brackets 108 to have both the transmission 38 and the wheel assemblies 20 positioned towards the rear of the frame. The axis of rotation of the countershaft 88 is centrally located with respect to the frame and coincides with the axis of the bearing 114 which supports the countershaft, whether the wheel assembly 20 is mounted towards the front or towards the rear of the frame 12. Similarly, whether the transmission 34 is mounted towards the front or towards the rear of the frame 12, the bearing 86 on the support member 84 is centrally located beneath the frame and remains in alignment with the bearings 114.

As best seen in FIGS. 4–6, when it is desired to mount the transmission 38 towards the front of the frame 12, for example when the planting units 14 are to be mounted across the entire width of the frame 12 in narrow row spacings, a simple crossover drive assembly 144 is provided. The crossover drive 144 includes a narrow housing member 146 adjustably secured to the frame 12 by bolts 148. Vertically spaced sprockets 150 and 152 are journaled in the housing member on the forward side of the frame 12 with similarly spaced sprockets 154 and 156 journaled on the opposite side. Idler members 148 and 160 are journaled in the housing 146 beneath the sprockets 152 and 154, respectively. A chain 162 is trained around the sprocket 150 and over the sprockets 152 and 154, around the sprocket 156 and over the idler members 160 and 162. The transmission, in this instance, terminates in a coupler or transmission shaft 164 which connects the output of the transmission to a collar 166 connected for rotation with the sprocket 150. The collar 166 is pinned to a hexagonal shaft 168 which rotates with the sprocket 150. The ends of the shafts 164 and 168 are reduced for positioning within the collar 166 and are secured therein by pins 170. The member 146, as best seen in FIGS. 4 and 6, is sufficiently narrow to be mounted between the U-bolts 28 of two adjacent planting units 14. The output shaft 60 of the transmission drives the coupler shaft 164 which is connected for rotation with the sprocket 150. The sprocket 156 rotates with the sprocket 150 through the chain 162 to drive the drill shaft 36. The hub of sprocket 156 has a hexagonal opening into which is inserted a hexagonal collar 172 which is slidably non-rotatably mounted on the drill shaft 36. A pair of set screws 174 secure the collar 172 against transverse movement on the shaft. When the drive assembly 144 is adjusted transversely on the frame, the set screws 174 are loosened so the collar 172 slides with the assembly on the drill shaft. Therefore, the crossover drive is easily repositionable with respect to the frame and the drill shaft to accommodate adjustments in the spacing and arrangement of the planting units of the frame.

The brackets and the open U-bolt configurations used with the brackets on the wheel assemblies and on the transmission or transmissions, as well as on the individual planting units 14, allow numerous combinations of component positions to be used. The transverse adjustment of the brackets is facilitated by the shaft and sprocket arrangement, and adjustment is simplified. The symmetrical nature of the drive design as a result of the centrally located countershaft 88 as discussed above, allows positioning of the transmission and/or the wheel assemblies towards the front or towards the rear of the frame. For narrow row spacings with the individual planting units 14 spaced along the entire length of the frame 12, both the transmission or transmissions and the wheel assemblies 20 can be mounted forwardly of the frame 12, as shown in FIG. 4. The crossover drive 144 is then utilized to transmit power from the front of the frame to the rear of the frame. As shown in FIGS. 1-3, if narrow row spacings are to be used but the planting units 14 do not extend the entire length of the frame, the transmission 34 can be mounted at the end of the frame with the wheel assemblies 20 mounted forwardly of the frame. If wider row spacings are used, the transmission can be bolted near the center and rearwardly of the frame. The ground wheel assemblies 20 can be mounted as desired and preferably rearwardly of the frame 12 between two adjacent planting units 14 when the wider row spacings are used. When a single transmission is mounted centrally of the frame, a single countershaft 88 is used and driven by ratchet assemblies similar to those shown at 126 in FIG. 2. When the transmission is mounted towards the front of the frame 12, a drive wheel assembly 20 can be mounted outwardly or inwardly (FIG. 4) of the transmission, or two drive wheel assemblies can be used with the transmission located between the assemblies. A large number of possible wheel assembly-transmission combinations are available to fit the desired row spacings and the number of individual planting units used, and the above embodiments are given as examples only to show the versatility provided by the present invention.

The planter seeding rate can be easily varied by changing the sprocket combinations on the input and output shafts of the transmission 38. Therefore, only one or two adjustments need be made, depending on whether one or two transmissions 40 are used, to adjust the seeding rate. When two transmissions are used, each driving the planting units 14 mounted on one-half of the frame 12, the drive loads are reduced. The functioning of the shear pins 76 which break upon excessive loading is improved by driving a smaller number of planting units 14 with each drill shaft 36.

All of the sprocket and ratchet assemblies which rotate with the countershaft 88 are slidable along the shaft and are easily positioned where desired without drilling holes so that they are compatible with the various wheel assembly-transmission combination possibilities. The countershaft bearing 86 supported from the transmission 38 and the bearings 96 on the wheel brackets 108 are aligned regardless of the location on the frame. The bearings 86 and 114 conveniently receive and provide support for the countershaft 88, eliminating need for a separate support bearing attached to the underside of the frame 12. Fewer non-positionable components are carried by the frame, and the wheel assemblies and transmission are easily repositioned to eliminate interference with the planting units when the row spacings or number of planting units are changed. With the permanent transmission removed from the center of the frame, the planter can be set up for wide row spacing, for example 36 inch rows for corn, and later additional units can be added between the existing units to provide narrow row spacing, for example 18 inch rows for beans. The drive assemblies and transmission can be relocated as necessary to accommodate the particular set up used. The need for two separate planters, one for narrow row crops and one for wider row crops, is thus eliminated.

We claim:

1. In a planter having a transverse main frame with substantially vertical fore-and-aft faces, a plurality of planting units adjustably secured to the frame for varying row widths, a drill shaft member for operating the planting units, a variably positionable transmission and drive assembly for driving the drill shaft member comprising:
   a transmission including an output connected for rotation with the drill shaft member, and an input;
   bracket means for securing the transmission in a one of a plurality of transverse positions along the frame out of interfering relationship with the planting units and for selectively varying the position as the planting units are adjusted for varying row widths;
   a shaft support carried by the transmission and including a first bearing member centrally positioned with respect to the fore-and-aft faces of the frame;
   a wheel assembly including a wheel bracket securable to the frame and transversely adjustable thereon, a ground wheel depending from the wheel bracket, and a second bearing member carried by the bracket and centrally positioned with respect to the fore-and-aft faces of the frame in transverse alignment with the first bearing member;
   a transverse countershaft supported for rotation by the first and second bearing members;
   means connecting the countershaft for rotation with the ground wheel; and
   means drivingly connecting the transmission input with the countershaft.

2. The invention defined in claim 1 wherein the means drivingly connecting the transmission input with the countershaft includes a transmission sprocket connected to the input and a shaft sprocket slidably non-rotatably disposed on the countershaft for fore-and-aft alignment with the transmission sprocket as the position of the transmission is varied, and chain means trained between the transmission and shaft sprockets.

3. The invention defined in claim 1 or 2 wherein the means connecting the countershaft with the ground wheel includes a wheel sprocket connected for rotation with the wheel and sprocket means slidably disposed on the countershaft for transverse alignment with the wheel sprocket as the wheel bracket is transversely adjusted and means rotatably connecting the wheel sprocket with the sprocket means.

4. The invention defined in claim 1 wherein the transmission is securable either towards the forward or the rearward side of the frame.

5. The invention defined in claim 1 or 4 wherein the ground wheel is securable either towards the forward or the rearward side of the frame.

6. The invention defined in claim 1 wherein the transmission is secured towards the rearward side and near one end of the frame outwardly of the outermost planting unit.

7. The invention defined in claim 1 wherein the transmission is secured towards the forward side of the frame and further comprises a crossover drive assembly for transferring drive from the transmission to the rearward side of the frame.

8. The invention defined in claim 7 wherein the crossover drive assembly is transversely adjustable on the frame and includes a sprocket assembly slidably, non-rotatably disposed about the drill shaft member.

9. The invention defined in claim 1 wherein the bracket means includes a vertical surface for positioning against a one of the fore-and-aft faces of the frame, and a U-bolt extending around the opposite face.

10. The invention defined in claim 1 wherein the transmission includes a lower portion extending vertically below the plane of the lower side of the frame and the shaft support means depends from the lower portion toward the fore-and-aft center of the frame.

11. The invention defined in claim 1 wherein the first and second bearing members are transversely adjustable with respect to the countershaft.

12. In a planter having a transverse main frame with fore-and-aft faces for adjustably mounting a plurality of planting units for varying row widths, a selectively positionable transmission and drive assembly for operating the planting units comprising:
a transmission selectively securable to one of the faces and transversely adjustable on the frame out of interfering relationship with the planting units and wherein the transmission extends forwardly of the frame when secured to the forward face and rearwardly of the frame when secured to the rearward face;
a wheel assembly including a wheel bracket carrying a fore-and-aft extending arm member and selectively securable to and transversely adjustable on the frame in either a forward or rearward arm extending position, a drive wheel rotatably carried by the arm member, and a first shaft support member centrally carried with respect to the fore-and-aft faces by the wheel bracket when in either of the arm extending positions;
a second shaft support member carried by the transmission and transversely aligned with the first shaft support member when the transmission is secured to either of the faces;
a countershaft rotatably carried by the first and second shaft support members;
first drive means rotatably coupling the drive wheel and the countershaft;
intermediate drive means coupling drive from the countershaft to the transmission; and
coupling means drivingly connecting the planting units with the transmission.

13. The invention defined in claim 12 wherein the first drive means includes a one-way clutch assembly slidably mounted on the countershaft for fore-and-aft alignment with the wheel assembly.

14. The invention defined in claim 12 wherein the intermediate drive means includes a sprocket member slidably, non-rotatably disposed on the countershaft for fore-and-aft alignment with the transmission.

15. The invention defined in claim 12 wherein the transmission is secured to the rearward face of the frame outside an outermost planting unit near the end of the frame.

16. The invention defined in claim 12 wherein the transmission is secured to the forward face and the coupling means includes a crossover assembly for transferring drive from the forward to the rearward side of the frame.

17. The invention defined in claim 12 wherein two transmission and drive assemblies are provided, one on each transverse half of the frame for operating the planting units mounted on that half.

18. The invention defined in claim 17 wherein each transmission is secured on the rearward face of the frame outside the outermost planting unit on that half of the frame.

19. The invention defined in claim 12 wherein the wheel bracket and the transmission are each secured to the frame by a pair of transversely spaced U-bolts.

20. The invention defined in claim 19 wherein the transmission and wheel assembly are secured on opposite sides of the frame, and at least one U-bolt for the wheel bracket is positionable between the pair of U-bolts for the transmission.

21. In a planter having a transverse main frame with generally vertical fore-and-aft faces for mounting a plurality of individual planting units for adjustable row widths, a positionable transmission and drive assembly for each transverse half of the frame for operating the planting units secured to that half comprising:
a transmission secured for transverse adjustment on the frame near the end thereof outside the outermost planting unit and including an input, and an output drivingly connected to the planting units;
a countershaft support carried by the transmission and extending therefrom to a location under the frame centered with respect to the fore-and-aft faces of the frame;
a wheel assembly including a bracket securable to and transversely adjustable on the frame, and a ground wheel supported from the bracket and including a wheel sprocket;
a countershaft bearing member supported by the bracket centrally under the frame in transverse alignment with the countershaft support;
a transverse countershaft slidably positionable with respect to and rotatably supported by the countershaft support and bearing member;
a sprocket member slidably mounted on and connected for rotation with the countershaft for fore-and-aft alignment with the wheel sprocket;
a chain trained between the sprocket member and the wheel sprocket; and
a drive member slidably, non-rotatably mounted on the countershaft for fore-and-aft alignment with and operably connected to the transmission input.

22. In a planter having a transverse main frame with generally vertical fore-and-aft faces for mounting a plurality of individual planting units for adjustable row widths, including narrow row widths with planting units mounted across substantially the entire transverse width of the frame, a transmission and drive assembly for driving the planting units comprising:
a transmission selectively securable towards the forward side of the main frame out of interfering relationship with the planting units and transversely adjustable on the frame to accommodate transverse adjustments and changes in the number of the planting units on the frame;

a wheel assembly, including a ground wheel, secured to and transversely adjustable on the frame;

first and second transversely aligned shaft support members carried by the wheel assembly and the transmission, respectively, beneath the frame between the planes of the fore-and-aft faces;

a transverse countershaft supported for rotation by and transversely positionable with respect to the support members;

countershaft drive means slidably mounted on the countershaft for alignment with and for receiving drive from the ground wheel;

transmission drive means slidably mounted on the countershaft for alignment with and for driving of the transmission;

crossover drive means for transmitting drive from the forward to the rearward side of the frame; and a drill shaft extending transversely on the rearward side of the frame operably connecting the planting units and the crossover drive means.

23. A drive assembly for use in a planter in which planter units are supported on a main transverse beam for adjusting for different row spacing, comprising:

a transverse countershaft alongside the beam;

a transmission having an input shaft and a drive mechanism extending to and driving a drill shaft disposed parallel to the beam, said transmission including supporting structure in the form of a pair of parallel vertical plates mounted on the beam for adjustment along the beam with at least one thereof having a journal support for the transverse countershaft;

a wheel support composed of upright plate structures mounted for adjustment along the beam and having a supporting journal member for said countershaft, and a fore-and-aft extending arm structure pivotally supported at one end to swing vertically with respect to the axis of said countershaft;

a ground engaging wheel mounted on the opposite end of the arm structure;

a drive sprocket supported in the arm structure to rotate with the wheel;

a driven sprocket on and for rotating the countershaft; and a drive mechanism extending between the countershaft and the transmission.

24. The invention defined in claim 23 further characterized by said parallel vertical plates and said upright plate structure may be selectively mounted on the beam to project forwardly or rearwardly thereof.

25. A seed planter having a transversely elongated frame with opposite ends; a plurality of planter units supported on the frame in a transverse row along the frame and transversely adjustable with respect to the frame with the respective end units of the row being offset inwardly of the ends of the frame so as to provide end sections on the frame unencumbered with a planter unit;

a pair of transversely extending and generally axially aligned planter unit drive shafts supported on the frame, said shafts having respective outer ends offset in the fore-and-aft direction from the frame end sections and extending inwardly therefrom in driving connection to the respective units of said row;

a drive shaft transmission supported on each of the respective frame end sections connected to the respective outer ends of the drive shafts and for independently driving the latter; and a pair of ground wheel drive mechanisms supported independently of and transversely adjustable with respect to the transmissions on the frame adjacent there respective transmissions, said mechanisms operably connected to the inputs of the respective transmissions to provide power thereto.

26. In a planter having a main transverse frame and a plurality of planter units supported on the frame in a transverse row extending substantially the full transverse width of said frame, said units extending rearwardly of the frame, said units further having a transverse horizontal main drive shaft extending between and for driving the units and disposed on the rear side of the frame, a drive mechanism comprising:

a ground wheel supported on the frame forwardly thereof;

a drive transmission supported on the frame forwardly thereof and terminating in a transverse horizontal transmission shaft parallel to the main drive shaft and disposed forwardly of the frame;

an upright and fore-and-aft extending U-shaped support structure supported on the frame and transversely adjustable with respect to the frame and the drive transmission, and including opposite vertical leg portions forwardly and rearwardly respectively of the frame and a bight portion vertically offset from the frame extending to and forming junctures with the leg portions;

rotary drive and driven members supported on the respective leg portions coupled to the transmission shaft and main drive shaft respectively;

idler members supported on the U-shaped support structure at the aforesaid junctures; and a continuous drive member trained around the drive, driven and idler members for transferring power from the transmission shaft to the main drive shaft.

27. A drive assembly for use in a planter in which planter units are supported on a main transverse beam for adjustment for different row spacings and in which includes a main transverse drive shaft extending between and for driving the units, the drive assembly comprising:

a transmission having a driving connection to said drive shaft and supported for adjustment along the beam in non-interferring relation to said units, said transmission having mounted thereon a transverse horizontal journal;

a ground wheel assembly including supporting structure shiftable along the beam and arm structure supported at one end on the supporting structure to swing vertically about an axis of the aforesaid journal, the supporting structure further having a transverse horizontal journal axially aligned with the aforesaid journal, and said wheel assembly having a ground wheel carried on the opposite end of the arm structure; a countershaft extending between and carried by both of said journals;

a first drive extending between the wheel and countershaft for driving the latter; and a second drive extending between the countershaft and transmission for effecting input to the latter.

28. In a planter having a transverse main frame, a plurality of planting units adjustably secured to the frame for varying row widths, and a drill shaft member for operating the planting units, a variably positionable transmission and drive assembly for driving the drill shaft member comprising:
- a transmission including an output connected for rotation with the drill shaft member, and an input;
- means for securing the transmission in one of a plurality of transverse positions along the frame out of interfering relationship with the planting units and for selectively varying the position as the planting units are adjusted for varying row widths;
- a shaft support carried by the transmission and including a first bearing member centrally positioned in the fore-and-aft direction with respect to the frame;
- a wheel assembly including a wheel bracket securable to the frame and transversely adjustable thereon, a ground wheel depending from the wheel bracket, and a second bearing member carried by the bracket and centrally positioned in the fore-and-aft direction with respect to the frame in transverse alignment with the first bearing member;
- a transverse countershaft supported for rotation by the first and second bearing members;
- means connecting the countershaft for rotation with the ground wheel; and
- means drivingly connecting the transmission input with the countershaft.

29. The planter as set forth in claim 28 wherein the wheel assembly further includes a fore-and-aft extending arm structure pivotally supported at one end to swing vertically with respect to the axis of the transverse countershaft and mounting the ground wheel at the opposite end.

30. In a planter having a transverse main frame for mounting a plurality of individual planting units for adjustable row widths, including narrow row widths with planting units mounted across substantially the entire transverse width of the frame, a transmission and drive assembly for driving the planting units comprising:
- a transmission extending forwardly from the main frame out of interfering relationship with the planting units and transversely adjustable on the frame to accommodate transverse adjustments of and changes in the number of the planting units on the frame;
- a wheel assembly, including a ground wheel, secured to and transversely adjustable on the frame;
- transversely aligned shaft support members carried by the wheel assembly and the transmission vertically offset from the frame;
- a transverse shaft supported for rotation by and transversely positionable with respect to the support members;
- drive means slidably mounted on the transverse shaft for alignment with and for receiving drive from the ground wheel;
- transmission drive means drivingly connected between the transverse shaft and the transmission;
- crossover drive means for transmitting drive from the transmission to the rearward side of the frame; and
- a drill shaft extending transversely on the rearward side of the frame operably connecting the planting units and the crossover drive means.

31. The planter as set forth in claim 30 wherein the crossover drive means comprises an upright and fore-and-aft extending U-shaped support structure supported on the frame and including opposite vertical leg portions forwardly and rearwardly respectively of the frame and a bight portion vertically offset from the frame extending to and forming junctures with the leg portions, and rotary drive and driven members supported on the respective leg portions drivingly coupled to the transmission and the drill shaft respectively.

32. In a planter having a transverse rectangular main frame and mounting a plurality of individual planting units for adjustable row widths, a drive comprising:
- a ground wheel assembly supported on the frame forwardly thereof;
- a transverse horizontal main drive shaft supported rearwardly of the main frame extending between and for driving of the units;
- a transmission supported on and transversely adjustable with respect to the frame and including an output shaft generally parallel to and forwardly of the frame and an input shaft;
- a ground wheel driven shaft supported by the main frame parallel to the main drive shaft and drivingly connected to the input shaft;
- an upright fore-and-aft extending housing member adjustably secured to the frame and transversely adjustable with respect thereto, said housing member including a forward leg portion extending upwardly from the lower portion of and adjacent the front of the main frame and an upper portion extending rearwardly from the forward leg portion adjacent the top of the main frame;
- a drive sprocket supported on the housing member for rotation about the axis of and operably connected to the transmission output shaft;
- a driven sprocket supported on the housing member near the aft end thereof and operably connected to the main drive shaft;
- idler members supported on the housing member generally above the drive sprocket; and
- a continuous drive member trained around drive and driven sprockets and the idler members so that it extends upwardly adjacent the front of the main frame and rearwardly from the idler members adjacent the top of the main frame for transferring power from the transmission output shaft over the frame to the main drive shaft.

* * * * *